Aug. 26, 1969 C. H. WICKENBERG 3,463,075
APPARATUS FOR PREPARATION OF COFFEE OR LIKE BEVERAGE
Filed April 8, 1968

INVENTOR
CHESTER H. WICKENBERG
BY Edward C. Threedy
HIS ATTORNEY.

United States Patent Office 3,463,075
Patented Aug. 26, 1969

3,463,075
APPARATUS FOR PREPARATION OF COFFEE
OR LIKE BEVERAGE
Chester H. Wickenberg, 890 Ford Ave.,
Elgin, Ill. 60120
Filed Apr. 8, 1968, Ser. No. 719,604
Claims priority, application Sweden, Apr. 11, 1967,
5,034/67
Int. Cl. A23f 1/08
U.S. Cl. 99—282            5 Claims

ABSTRACT OF THE DISCLOSURE

An apparatus for preparation of coffee or like beverages in which water is heated and caused to seep through ground coffee within the apparatus, including a heat responsive element for controlling the electric energization of the water heating unit.

---

In apparatus of this type the water is heated by letting it flow from a container into a heating body. After heating, the hot water is caused to flow through ground coffee in a container having a filtering bottom which permits the water to pass through but retains the ground coffee. To control the water temperature so that vaporizing is avoided and an effective extraction of the coffee is brought about, a thermostatic control of the heating body is used. Thereby, the heating body is also protected from being destroyed in case the apparatus should be left connected with no water in it.

A method of effecting thermostatic control is to use a so-called thermostatic disc, i.e., a bimetal disc which at a certain temperature changes from concave to convex shape, and to have this act upon a switch. However, the restoring temperature of such thermostatic disc is considerably lower and, therefore, the temperature of the heating body and hence also the temperature of the water would vary within rather wide limits.

The purpose of the present invention is to eliminate the above mentioned drawback and make it possible to use a thermostatic disc for accurate control of the water temperature in an apparatus of the above type.

Figure 1:
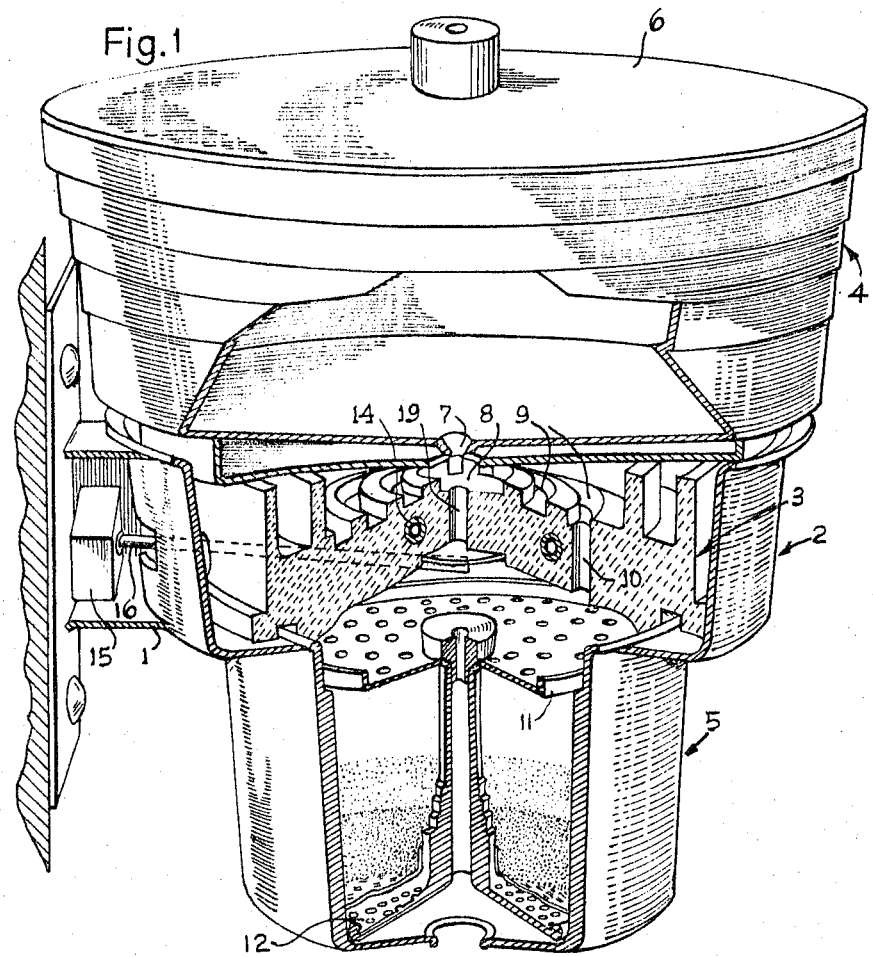
Figure 2:
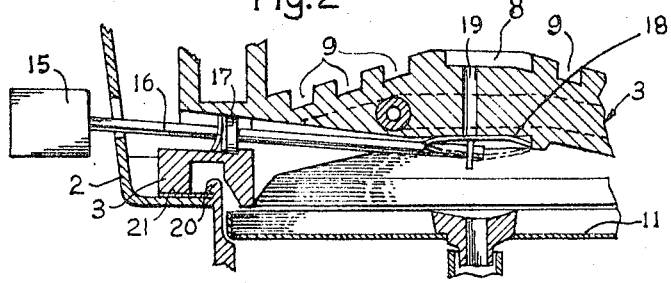

The invention will be best understood by reference to the accompanying drawing in which there is shown a preferred form of construction and in which FIG. 1 is a perspective view, with parts broken away, of a coffee preparing apparatus according to the invention, FIG. 2 shows a vertical section through a portion of the apparatus according to FIG. 1.

In the drawing, there is shown a coffee preparing apparatus secured in a support 1, which is intended to be attached to a wall or the like. Of course, it is also conceivable as an alternative to have a support intended to be placed on a horizontal surface, in which case it holds the apparatus sufficiently above this surface to allow a vessel receiving the ready coffee to be put under the apparatus. The apparatus comprises three main parts, viz., one part 2 attached to the support 1 and containing a heating body 3, a water container 4, which is detachably placed on top of part 2, and a coffee container 5, which is detachably fastened under part 2.

The water container 4 is provided with a removable cover 6 and has in its bottom an orifice 7, which is of such size that the total time required for emptying the water container through the orifice 7 is suitable for good extraction of the coffee in the coffee container 5.

Through the orifice 7 in the bottom of the water container 4, the water flows down into a recess 8 in the heating body 3 where it is distributed and caused to flow in three spiral-shaped grooves 9 in the upper surface of the heating body, this surface being somewhat conical so that the grooves 9 slope in a direction away from the recess 8. The grooves 9 terminate at their outer ends in holes 10 which pass through the heating body and through which the water flows down into a distributing plate 11 attached in the upper part of the coffee container 5 or alternatively in the lower part of the heating body 3.

The distributing plate 11 has a certain number of holes, which cause the hot water to be distributed over the plate and to fall down in the form of small drops on the ground coffee lying on a perforated bottom 12, which is located a little above the bottom of the coffee container 5. In the bottom of the coffee container 5, there is a centrally situated outlet opening 13 through which the ready coffee flows out and falls into a collecting vessel, which is not shown in the drawing. To facilitate the draining, the bottom of the coffee container 5 is made somewhat sloping towards the outlet opening 13.

Electrical resistance heating elements 14 are arranged in the heating body 3 and are supplied with current through a switch 15, which is fitted in the support 1 of the apparatus. The switch is operated by means of one end of a rod 16, which is pivotally supported in a bearing 17 in a hole in the heating body 3 and the other end of which extends to the center of the underside of the heating body 3. A recess in the underside of the heating body houses a thermostatic disc 18 against which the end of the rod 16 rests with a slight pressure. Thereby the thermostatic disc 18 in its turn rests against the heating body 3 and at a suitable temperature changes from the shape shown in the drawing to a shape which gives its underside a convex bend. This causes the rod 16 to pivot around the bearing 17 and the switch 15 disconnects the current to the heating elements 14.

To counteract the drawback of the great difference between the connecting and disconnecting temperatures of the thermostatic disc 18, the heating body 3 is provided with a channel 19 which forms a connection between the recess 8 and the recess in the underside of the heating body where the thermostatic disc 18 lies. The channel 19 is also located under the orifice 7 in the water container 4. When the thermostatic disc 18 changes its shape and disconnects the current, the channel 19 will open and cause a small quantity of cold water to flow down through it cooling the thermostatic disc 18 which then quickly gets such a temperature that it returns to its original shape and again closes the current to the heating elements 14. During this time, the heating body 3 has not been able to cool down very much and the result is that the water flowing down into the distributing plate will have a very even and high temperature.

The coffee container 5 can be removed from the apparatus and is attached to it by a thickened brim 20 at the top being pressed past a rubber ring 21, which is fastened between the heating body 3 and the bottom of the part 2. Thereby a sealing is obtained also between the coffee container 5 and the part 2.

If the water container 4 is removed, the collecting vessel can be put in its place and the ready coffee be kept warm by the heat transfer from the heating body 3.

Having thus described my invention, what I claim as new and desire to protect by Letters Patent is:

1. A coffee apparatus having a liquid reservoir and a brewing container, a liquid heating chamber between the reservoir and the brewing container housing an electric heating element the energization of which is controlled by an external switch wherein the improvement comprises
   (a) a channel in the heating element for receiving a quantity of liquid as it flows from the reservoir into the heating chamber,
   (b) a thermal responsive means carried by the heating element at one end of the channel and having a first position substantially in full facial contact with the heating element and closing said channel, and a second position generally spaced from the heating element and opening the channel, and (c) means connected to said thermal responsive means and movably responsive to its different positions for actuating the switch to control the energization of the electric heating element to heat the liquid flowing from the reservoir and into the brewing chamber.

2. A coffee apparatus as defined by claim 1 wherein said thermal responsive means is a thermostatic metallic disc having a predetermined configuration and which when heated will reverse its configuration with a snap action.

3. A coffee apparatus as defined by claim 1 wherein said means connected to said thermal responsive means and movably responsive thereto comprises a switch actuating rod pivoted by said thermal responsive means as it moves from its first position into its second position.

4. A coffee apparatus as defined by claim 3 wherein said thermal responsive means is a thermostatic metallic disc having a predetermined configuration and which when heated will reverse its configuration with a snap action.

5. A coffee apparatus as defined by claim 1 and further characterized by having the heating element provided with a conical upper surface, having formed therein spirally arranged grooves through which the water flows while being heated by the heating element before it passes into the brewing container.

References Cited
UNITED STATES PATENTS

| | | | |
|---|---|---|---|
| 2,568,474 | 9/1951 | Sciver | 99—281 |
| 2,829,583 | 4/1958 | Leonard | 99—282 |
| 2,926,234 | 2/1960 | Palmer | 99—281 X |
| 3,347,151 | 10/1967 | Ronalds | 99—281 X |

ROBERT W. JENKINS, Primary Examiner

U.S. Cl. X.R.

99—304